(12) United States Patent
Shih

(10) Patent No.: US 8,974,358 B2
(45) Date of Patent: Mar. 10, 2015

(54) MULTI-SPINDLE MACHINING MACHINE WITH TOOL CHANGING MECHANISM

(71) Applicant: Cheng Hsiu Shih, Taichung (TW)

(72) Inventor: Cheng Hsiu Shih, Taichung (TW)

(73) Assignee: Shenq Fang Yuan Technology Co., Ltd., Taichung (TW)

( * ) Notice: Subject to any disclaimer, the term of this patent is extended or adjusted under 35 U.S.C. 154(b) by 418 days.

(21) Appl. No.: 13/644,730

(22) Filed: Oct. 4, 2012

(65) Prior Publication Data

US 2014/0100095 A1    Apr. 10, 2014

(51) Int. Cl.
| | |
|---|---|
| B23Q 3/157 | (2006.01) |
| B23Q 11/08 | (2006.01) |
| B23Q 11/00 | (2006.01) |
| B23B 31/20 | (2006.01) |
| B23Q 1/48 | (2006.01) |
| B23Q 1/62 | (2006.01) |
| B23Q 3/155 | (2006.01) |

(52) U.S. Cl.
CPC ..... B23Q 11/0067 (2013.01); *B23B 2231/2078* (2013.01); *Y10T 483/115* (2015.01); B23B 31/20 (2013.01); *Y10T 483/136* (2015.01); *Y10T 483/1795* (2015.01); *Y10T 483/11* (2015.01); B23Q 11/08 (2013.01); *Y10T 483/1809* (2015.01); *Y10T 483/1705* (2015.01); B23Q 1/4852 (2013.01); B23Q 1/621 (2013.01); B23Q 3/15526 (2013.01); B23Q 3/15706 (2013.01); B23Q 11/0046 (2013.01)
USPC .......... 483/56; 483/3; 483/2; 483/10; 483/18; 483/59; 483/67; 279/43.8

(58) Field of Classification Search
CPC ..................... Y10T 483/179; Y10T 483/1793; Y10T 483/1795; Y10T 483/1798; Y10T 483/1873; Y10T 483/1882; Y10T 483/1705; Y10T 483/11; Y10T 483/115; Y10T 483/13; Y10T 483/136; Y10T 483/138; Y10T 483/14; Y10T 483/1809
USPC ........... 483/54–57, 66–67, 18, 3, 2, 11, 10, 7, 483/12, 59; 409/137, 136, 135, 134
See application file for complete search history.

(56) References Cited

U.S. PATENT DOCUMENTS

| | | | | |
|---|---|---|---|---|
| 1,855,515 | A * | 4/1932 | Dingell | 279/43.8 |
| 4,700,452 | A * | 10/1987 | Babel | 483/54 |
| 5,649,887 | A * | 7/1997 | Taki et al. | 483/3 |
| 6,077,206 | A * | 6/2000 | Azema | 483/3 |
| 6,126,526 | A * | 10/2000 | Herrscher et al. | 451/259 |
| 6,387,026 | B1 * | 5/2002 | Schweizer et al. | 483/55 |
| 7,442,154 | B2 * | 10/2008 | Boehler et al. | 483/50 |
| 7,462,145 | B2 * | 12/2008 | Bader et al. | 483/63 |
| 8,221,297 | B2 * | 7/2012 | Faust | 483/59 |
| 8,308,621 | B2 * | 11/2012 | Shih | 483/56 |
| 8,333,536 | B2 * | 12/2012 | Shih | 409/137 |
| 2004/0102297 | A1* | 5/2004 | Quak et al. | 483/56 |
| 2011/0085863 | A1* | 4/2011 | Shih | 408/42 |

* cited by examiner

*Primary Examiner* — Erica E Cadugan

(57) ABSTRACT

A multi-spindle machining machine with a tool changing mechanism contains a base; a carrier including a seat to move in Z axis, a rotary shaft fixed on the seat laterally to drive the seat to rotate in A axis, and a fixing holder coupled to an end portion of the rotary shaft to fix a work piece; a tool changing mechanism including a mount mounted to the rotary shaft to rotate with the rotary shaft and a monitor fixed on the seat to measure a length of the tool clamped on a driving spindle, and including a plurality of slots to receive the tools respectively; a working head moving above the carrier and the tool changing mechanism in X and Y axes and including the driving spindle mounted on a lower end thereof to rotate axially, and the lower end of the driving spindle allowing to engage and disengage the tool.

11 Claims, 11 Drawing Sheets

MULTI-SPINDLE MACHINING MACHINE WITH TOOL CHANGING MECHANISM

This application is a Continuation-in-Part of application Ser. No. 12/578,583, filed Oct. 13, 2009.

BACKGROUND OF THE INVENTION

Description of the Prior Art

A conventional machining machine is high so as to increase its length and width, yet increasing its size, production cost, and tool changing time.

In addition, another conventional machining machine contains a tool changing mechanism, and wherein the tool changing mechanism is disposed within a movable range of a carrier of a base and a working range of a working head, and an additional driving device is required in this tool magazine of the tool changing mechanism so as to drive the tool magazine, thus increasing machine size, having complicated structure, and causing high production cost. It is to be noted that when the tool magazine is far away from the working head, the tool change time is prolonged, thus decreasing tool changing efficiency.

The present invention has arisen to mitigate and/or obviate the afore-described disadvantages.

SUMMARY OF THE INVENTION

The primary object of the present invention is to provide a multi-spindle machining machine with a tool changing mechanism which allows lowering size and production cost and enhancing tool changing efficiency.

Another object of the present invention is to provide a multi-spindle machining machine with a tool changing mechanism which has an excellent clamp effect.

A multi-spindle machining machine with a tool changing mechanism in accordance with a preferred embodiment of the present invention contains:

a base;

a carrier including a seat, a rotary shaft, and a fixing holder, the seat allowing to move in a vertical direction, and the vertical direction is a Z axis, the rotary shaft being fixed on the seat laterally and driving the seat to rotate in an axial direction, and the axial direction is an A axis, the fixing holder being coupled to an end portion of the rotary shaft to fix a workpiece thereon;

a tool changing mechanism including a mount and a monitor, the mount being mounted to the rotary shaft so as to rotate with the rotary shaft, and including a plurality of slots linearly arranged on an upper side and a lower side of the mount so as to receive the tools respectively, the monitor being fixed on the seat to measure a length of the tool clamped on the driving spindle;

a working head moving above the carrier and the tool changing mechanism in a horizontal direction, and the horizontal direction being the X axis and a Y axis, and working head including a driving spindle mounted on a lower end thereof to rotate axially, and the lower end of the driving spindle allowing to engage and disengage the tool of the tool changing mechanism.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
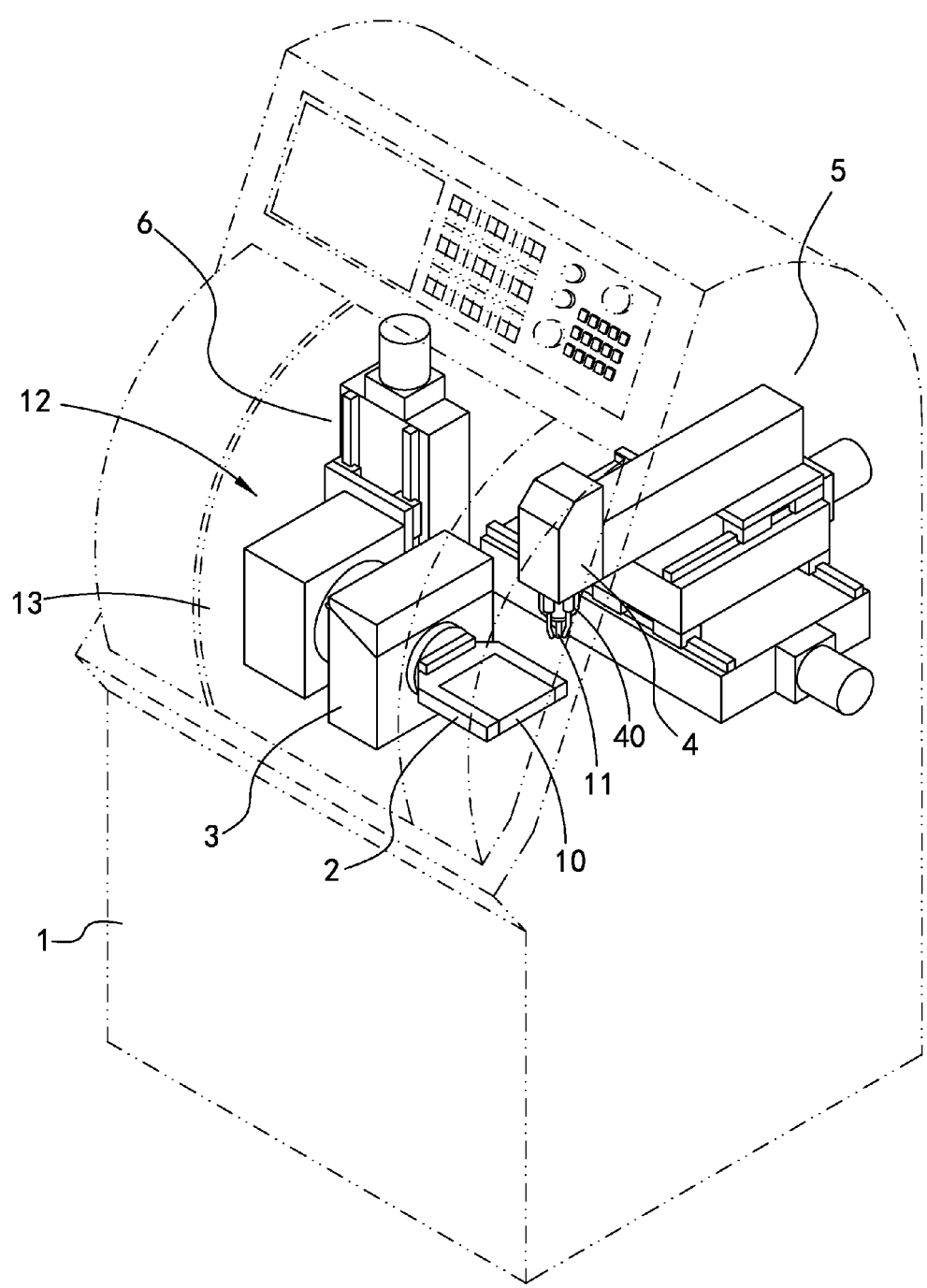
FIG. 1 is a perspective view showing the assembly of a multi-spindle machining machine with a tool changing mechanism in accordance with the present invention.

Referring to FIG. 1, a multi-spindle machining machine with a tool changing mechanism in accordance with a preferred embodiment of the present invention comprises a base 1, a carrier 2, a tool changing mechanism 3, a working head 4, a lateral driving device 5, and a vertical driving device 6, wherein the base 1 includes a chamber 12 to move the carrier 2 and the working head 4 so as to have a working process therein. The chamber 12 includes a transparent cover 13 disposed on one side thereof to be turned, to monitor the working process and to be opened to install the workpiece 10 onto the carrier 2 or to remove the workpiece 10 from the carrier 2.

The carrier 2 is provided to move the workpiece 10 in the chamber 12 to move in Z axis.

The tool changing mechanism 3 is assembled to the carrier 2 to receive a plurality of tools 11 and to move vertically with the carrier 2. The tool 11 is a milling cutter, a drill, and a grinding cutter, etc.

The working head 4 moves above the carrier 2 and the tool changing mechanism 3 in X and Y axes and includes a driving spindle 40 mounted on a lower end thereof to rotate axially, and the lower end of the driving spindle 40 allows to engage and disengage the tool 11 of the tool changing mechanism 3. The driving spindle 40 allows clamping the tool 11 to have a cutting, drilling, and grinding process.

The lateral driving device 5 is located on a back side of the chamber 12 to drive the working head 4 to move laterally.

The vertical driving device 6 is located on a left side of the chamber 12 to drive the carrier 2 to move vertically.

Figure 2:
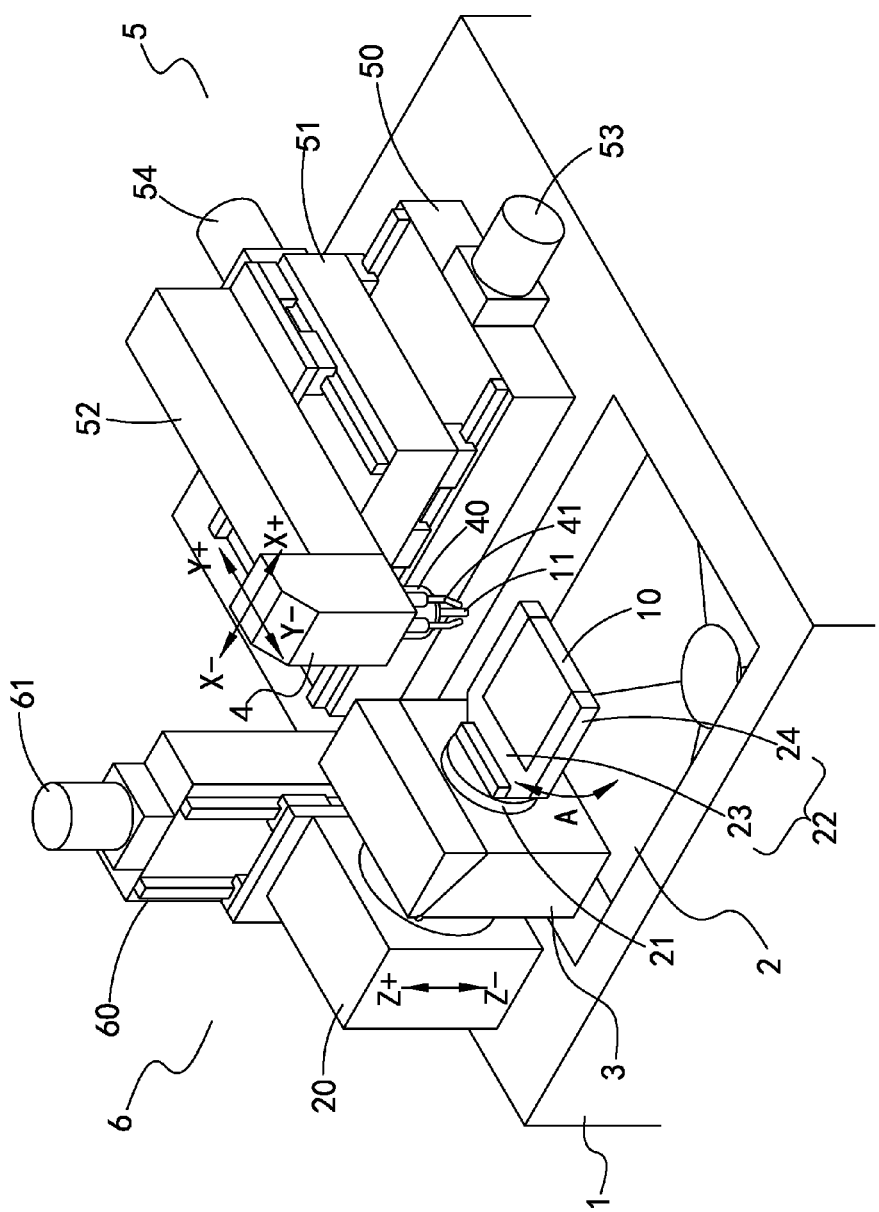
FIG. 2 is a partial amplified view of the multi-spindle machining machine with the tool changing mechanism in accordance with the present invention.

Referring to FIG. 2, the carrier 2 includes a seat 20, a rotary shaft 21, and a fixing holder 22. The seat 20 is driven by the vertical driving device 6 to move in Z axis, the rotary shaft 21 is fixed on the seat 20 laterally and drives the seat 20 to rotate in A axis by using an air cylinder, and a servo motor. The fixing holder 22 includes a lateral shank 23 and two positioning rods 24, the lateral shank 23 is coupled to the rotary shaft 21, and the two positioning rods 24 extend vertically from two ends of the lateral shank 23 to fix the workpiece 10 thereon so that two upper and lower opposite sides expose between the two positioning rods 24. The fixing holder 22 is designed to have different structures based on different shapes of workpiece 10. For example, the fixing holder 22 is formed in a square shape to match with a circular fixing holder to clamp the workpiece 10, and the fixing holder 22 is formed to match with a cylindrical workpiece to clamp or insert a paw or sleeve.

The working head 4 includes at least one nozzle 41 to spray cutting oil or air.

The lateral driving device 5 includes a first guiding member 50, a second guiding member 51, a work pedestal 52, a first driver 53, and a second driver 54. The first guiding member 50 is mounted on the base 1, the second guiding member 51 is fixed on the first guiding member 50 to move along the X axis. The work pedestal 52 is secured to the second guiding member 51 to move along the Y axis, the first diver 53 is a servo motor and is disposed on the first guiding member 50 to drive the second guiding member 51 to move. The second driver 54 is a serve motor and is fixed on the second guiding member 51 to drive the work pedestal 52 to move. The working head 4 is connected to the work pedestal 52.

The vertical driving device 6 includes a third guiding member 60 and a third driving driver 61. The third guiding member 60 is disposed on the base 1, the seat 20 of the carrier 2 is fixed on the third guiding member 60 to move along the Z axis. The third driver 61 is secured on the third guiding member 60 to drive the seat 20 to move.

Figure 3:
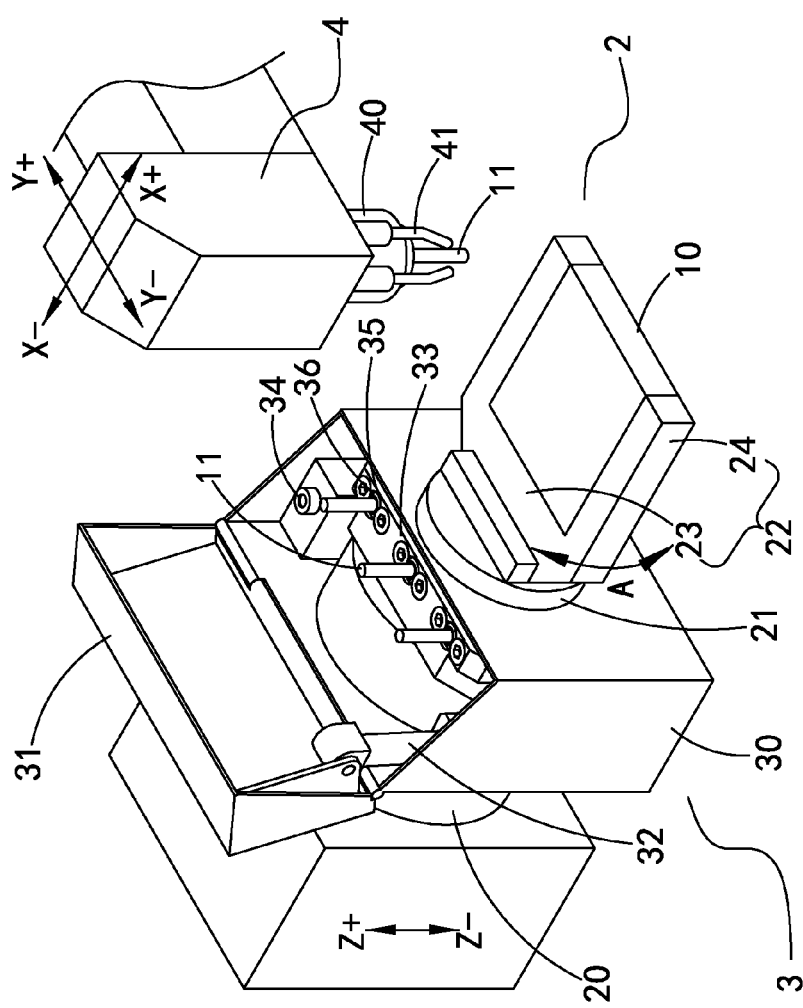
FIG. 3 is an amplified view of a tool changing mechanism of the multi-spindle machining machine in accordance with the present invention.
Figure 4:
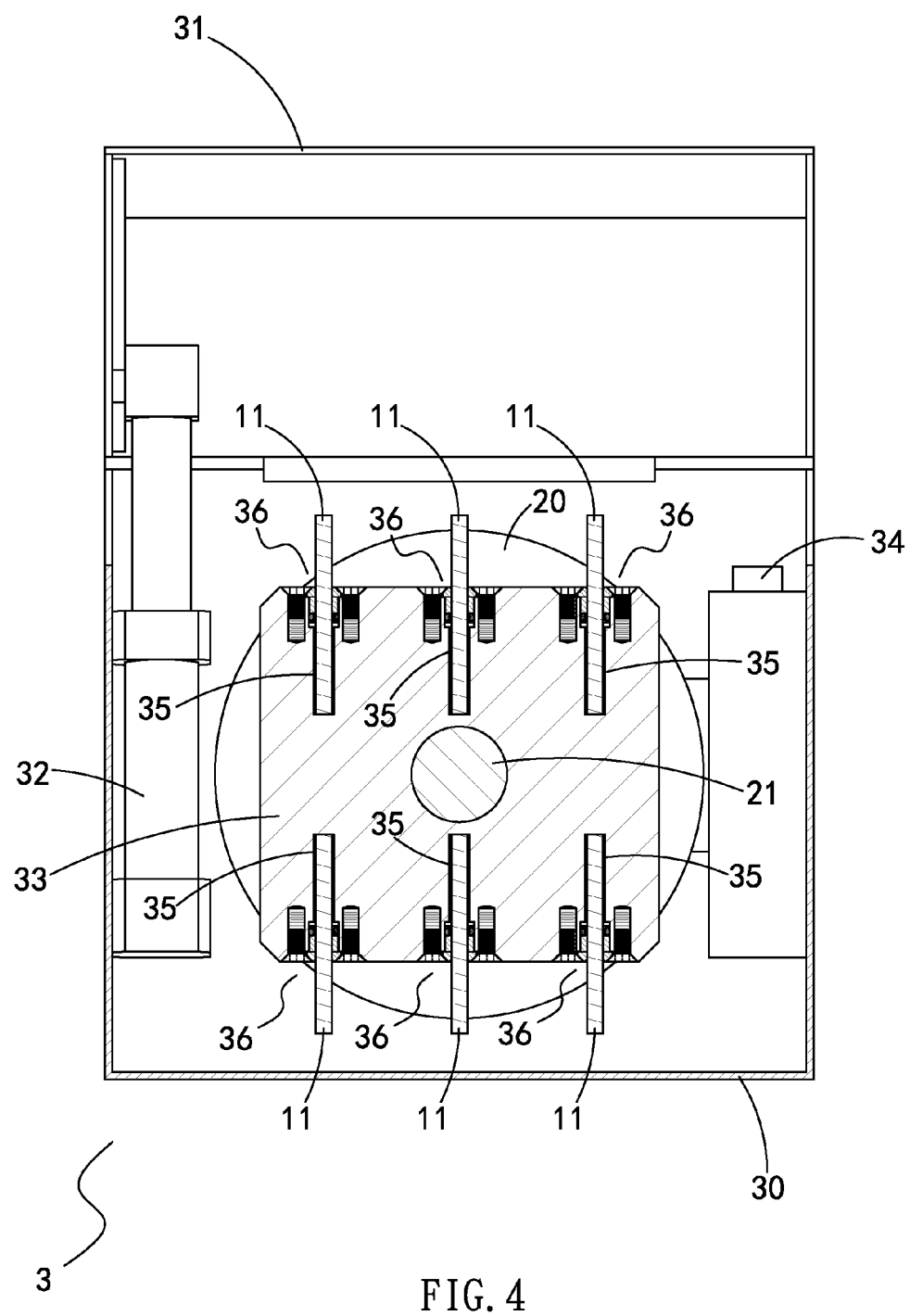
FIG. 4 is a cross sectional view of the tool changing mechanism of the multi-spindle machining machine in accordance with the present invention.
Figure 5:
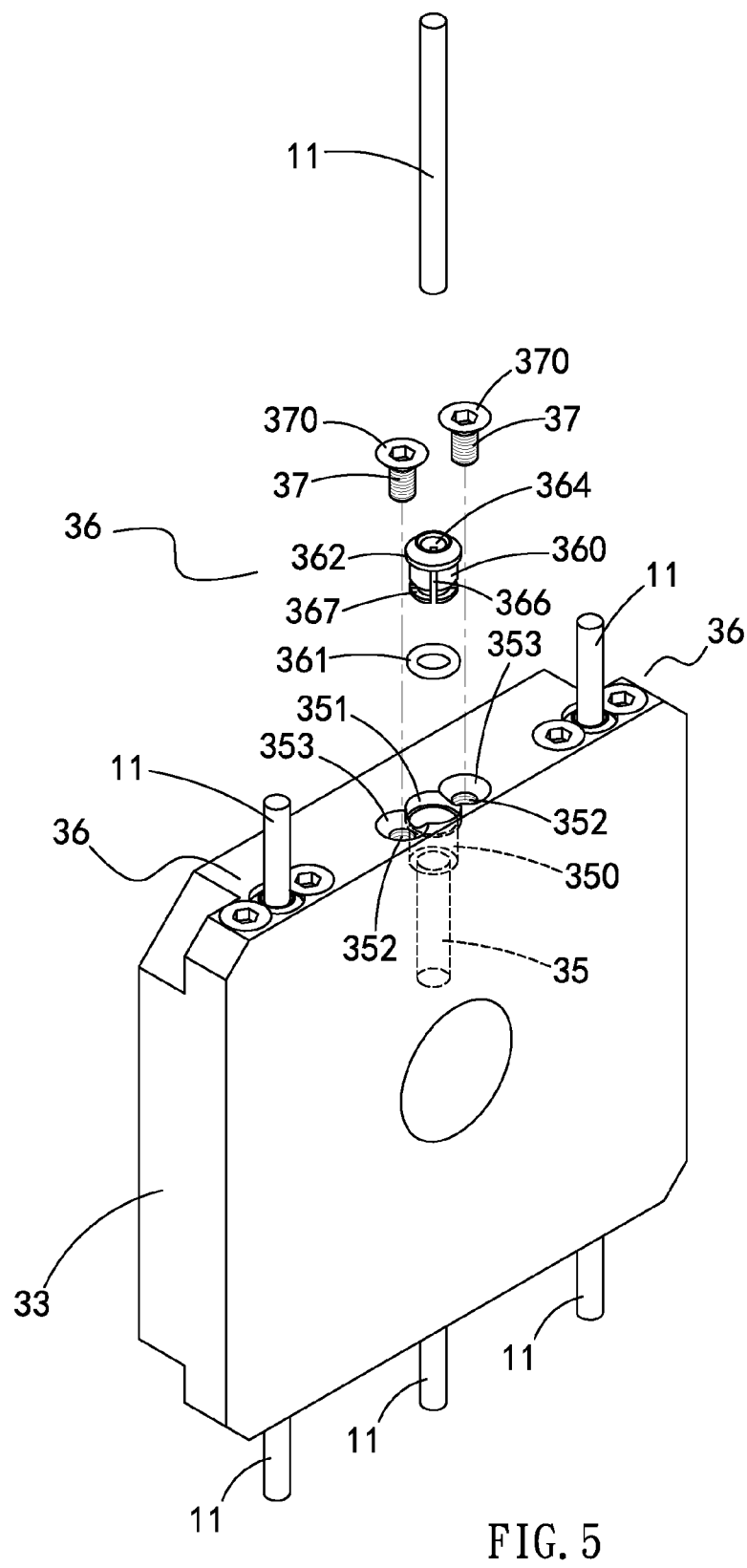
FIG. 5 is a perspective view showing the assembly of a fixture module of the tool changing mechanism of the multi-spindle machining machine in accordance with the present invention.
Figure 6:
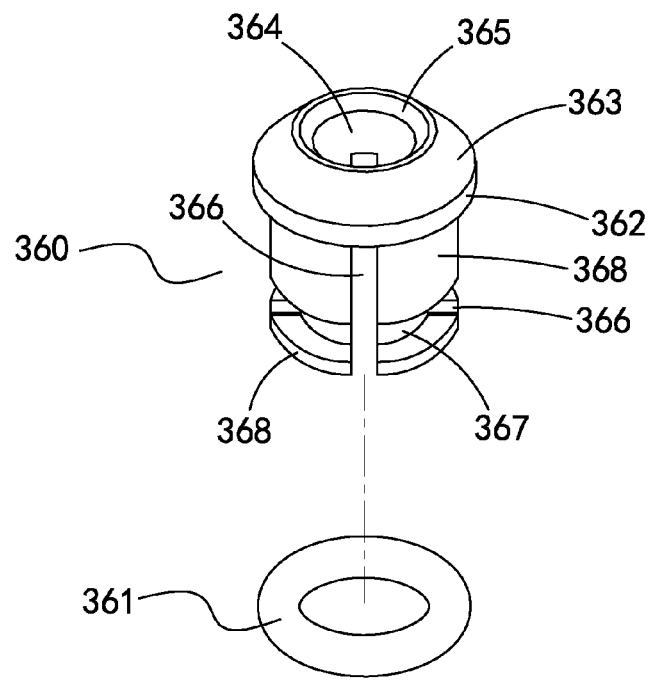
FIG. 6 is a perspective view showing the assembly of a retaining sheath and an O ring of the tool changing mechanism of the multi-spindle machining machine in accordance with the present invention.
Figure 7:
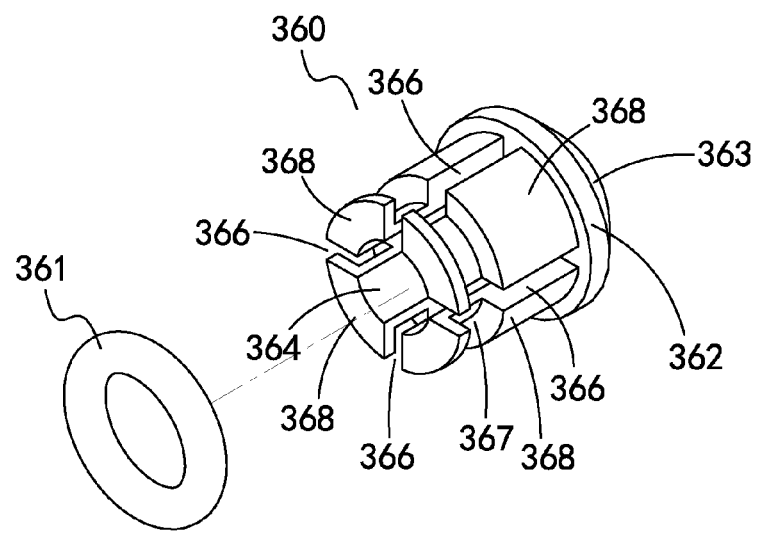
FIG. 7 is another perspective view showing the assembly of the retaining sheath and the O ring of the tool changing mechanism of the multi-spindle machining machine in accordance with the present invention.
Figure 8:
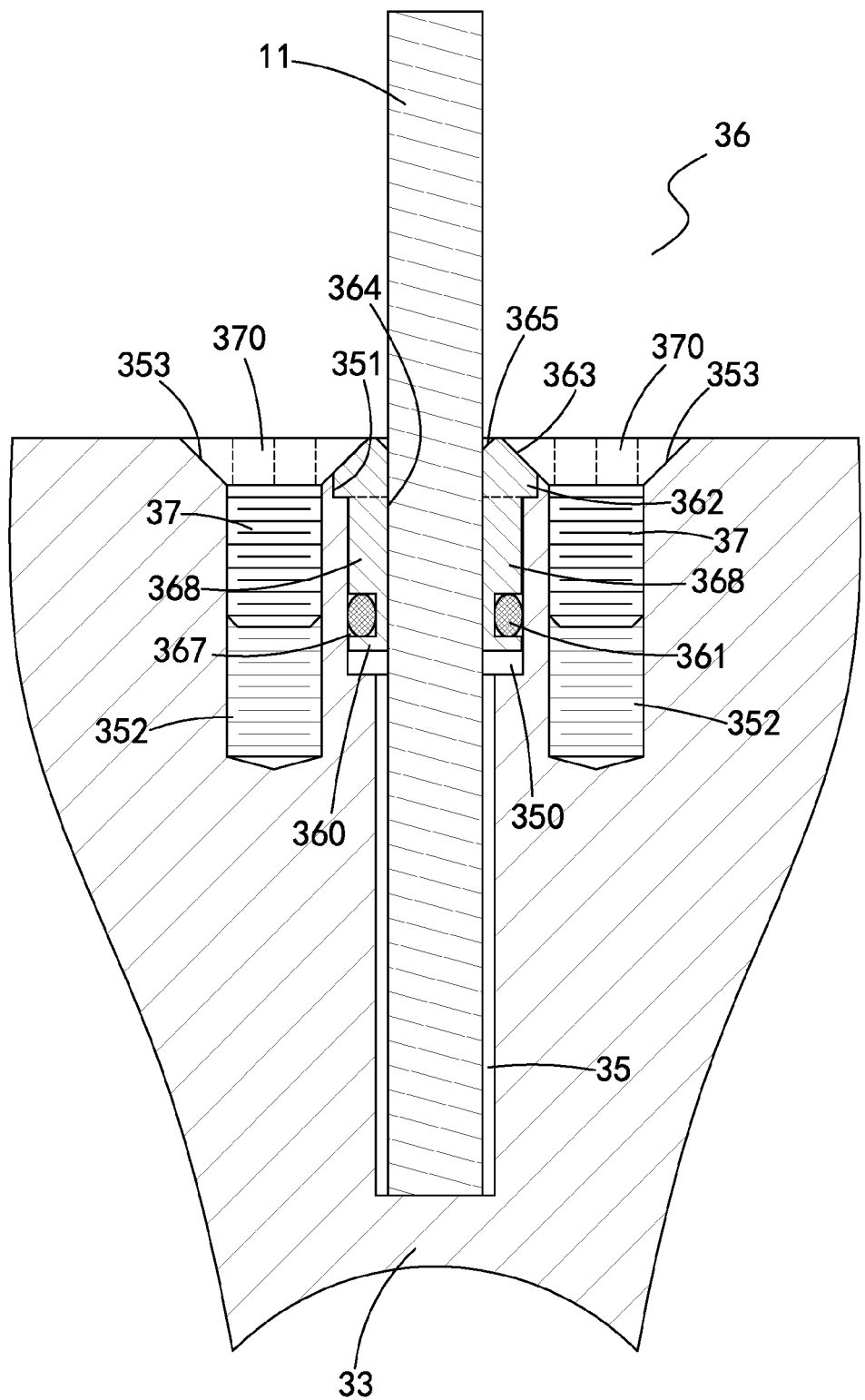
FIG. 8 is a cross sectional view showing the assembly of the fixture module of the tool changing mechanism of the multi-spindle machining machine in accordance with the present invention.

As shown in FIGS. 3 and 4, the tool changing mechanism 3 includes a case 30, a housing 31, a driving member 32, a mount 33, a monitor 34, and a plurality of fixture modules 36, wherein the case 30 is assembled to the seat 20 to be inserted by the rotary shaft 21, and includes an opening formed on an upper end thereof.

The housing 31 is assembled to the case 30 to open or close the opening of the case 30.

The driver 32 is disposed in the case 30 to drive the housing 31 to be open or close the opening of the case 30, and the driver 32 is a pneumatic cylinder.

The mount 33, is formed in a rectangle shape, is mounted on the rotary shaft 21, rotates with the rotary shaft 21, and includes a plurality of slots 35 linearly arranged on an upper side and a lower side of the mount 33 so as to receive the tools 11.

The monitor 34 is fixed on the seat 20 and located at the case 30 to measure a length of the tool 11 clamped on the driving spindle 40.

The plurality of fixture modules 36 are connected on mouths of the plurality of slots 35 so as to clamp the plurality of tools 11 so that the plurality of tools 11 do not disengage from the plurality of slots 35.

Thereby, the tool changing mechanism 3 is fixed on the carrier 2 and shares the same driving devices so as to simplify machine structure and to decrease machine size and production cost. In addition, such an arrangement allows shortening a distance between the mount 33 and the working head 4, thus enhancing tool change efficiency. Preferably, the mount 33 rotates with the rotary shaft 21 so that the plurality of tools 11 allow being used to save using space. Furthermore, the seat 20 of the carrier 2 is driven by the vertical driving device 6 to move vertically, and the working head 4 is driven by the lateral driving device 5 to move horizontally so as to reduce machine size and production cost. Also, the workpiece 10 on the fixing holder 22 is rotated by the rotary shaft 21 so as to be worked on its double sides and in a tilted direction and to clean cutting chips easily. The case 30 and the housing 31 are used to prevent the cutting chips from falling on the plurality of fixture modules 36 or the plurality of tools 11 so that the tool change operates well.

As shown in FIGS. 5-8, each slot 35 of the mount 33 has a cavity 350 with a larger diameter, and the cavity 350 has a limit recess 351 with a larger diameter. The each slot 35 of the mount 33 has two orifices 352 defined on two opposite sides thereof, and each orifice 352 has a conical notch 353 communicating with the limit recess 351.

Each fixture modules 36 includes a retaining sheath 360, an O ring 361, and two screw bolts 37. The retaining sheath 360 is fixed in the cavity 350 and has a protrusion 362 with a larger diameter mounted on an upper side thereof and retained in the limit recess 351, the protrusion 362 has a conical face 363 defined on an upper rim thereof. The retaining sheath 360 has an aperture 364 defined therein to insert a tool 11, and the aperture 364 has an increased bore 365 arranged on an upper side thereof to guide the tool 11 to move into the aperture 364. The retaining sheath 360 has a plurality of cutouts 366 and an indention 367, and each cutout 366 communicates with the aperture 364 and extends toward a lower end of the each cutout 366 so that between the plurality of cutouts 366 are defined a plurality of clamping paws 368. The indention 367 is formed around the plurality of clamping paws 368. The O ring 361 is fitted in the indention 367 so as to form an elastic force, such that the plurality of clamping paws 368 deform inwardly and flexibly to clamp the plurality of tools 11. The two screw bolts 37 are screwed in the two orifices 352, and each screw bolt 37 has a conical head portion 370 defined on a top end thereof so as to be retained on the conical face 363 of the protrusion 362, such that the retaining sheath 360 is screwed in the cavity 350. In this embodiment, the retaining sheath 360 is made of plastic material, and the O ring 361 is made of plastic material as well.

Thereby, the elastic force of the O ring 361 make the plurality of clamping paws 368 flexible inwardly so that the plurality of clamping paws 368 clamp the plurality of tools 11 securely and force a clamp force on the plurality of tools 11 evenly, hence the plurality of tools 11 are inserted into the plurality of slots 35 so that central axial lines of the plurality of tools 11 do not offset, thus changing tool exactly.

Figure 9:
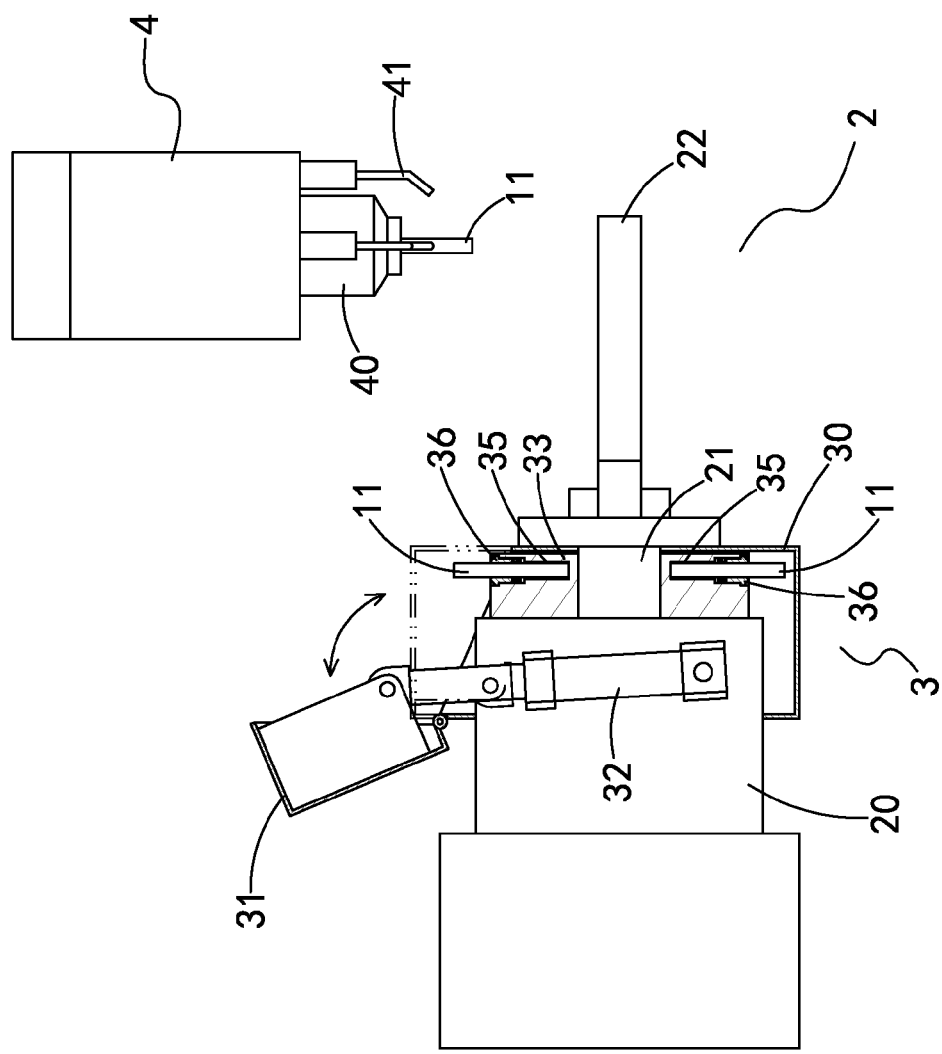
FIG. 9 is a cross sectional view showing the operation of the tool changing mechanism of the multi-spindle machining machine in accordance with the present invention.
Figure 10:
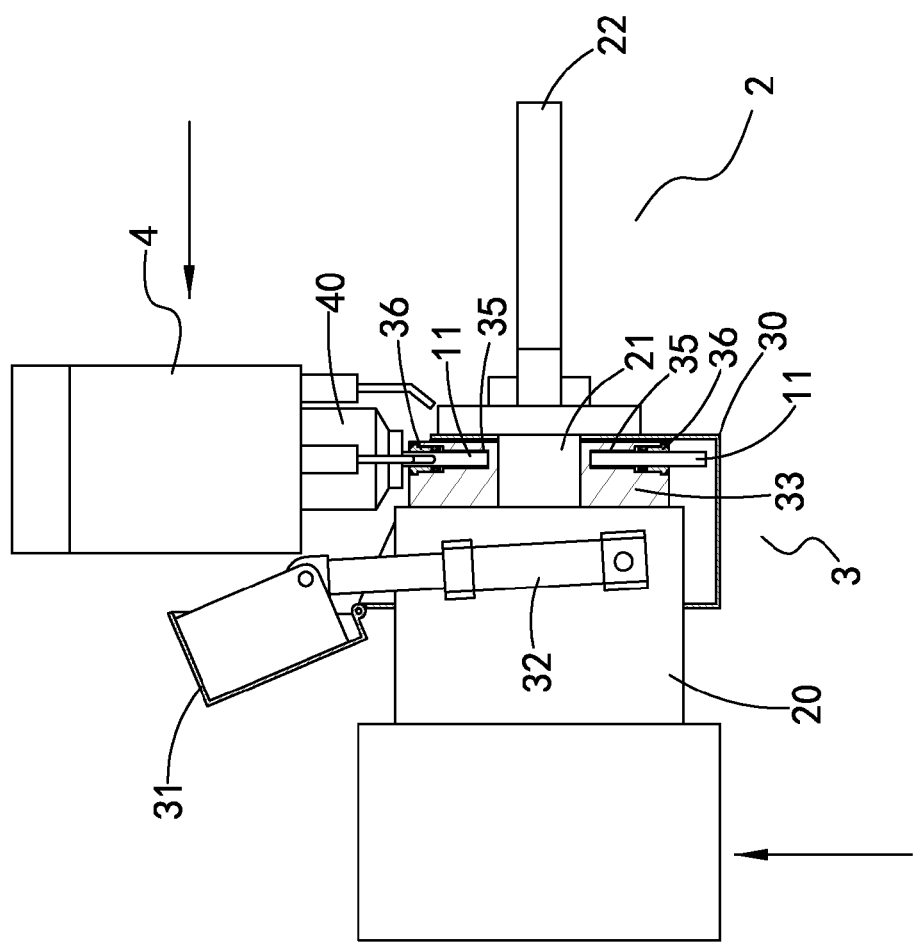
FIG. 10 is another cross sectional view showing the operation of the tool changing mechanism of the multi-spindle machining machine in accordance with the present invention.

As illustrated in FIGS. 9 and 10, when changing the tools 11, the driving member 32 drives the housing 31 to open the opening of the case 30, and the working head 4 moves above the case 30 laterally. Thereafter, the seat 20 of the carrier 2 moves upward to insert the tool 11 of the driving spindle 40 to an empty slot 35, and the driving spindle 40 releases the tool 11, and the seat 20 moves downward to make the mount 33 rotate to a desired tool 11 under the driving spindle 40, and then the seat 20 moves upward and the driving spindle 40 engages the tool 11. After the driving spindle 40 engages the tool 11, the seat 20 moves vertically and the working head 4 moves horizontally to cooperate with the monitor 34 to measure the length of the tool 11 on the driving spindle 40, such that the opening of the case 30 is closed to finish onetime of tool changing operation.

Figure 11:
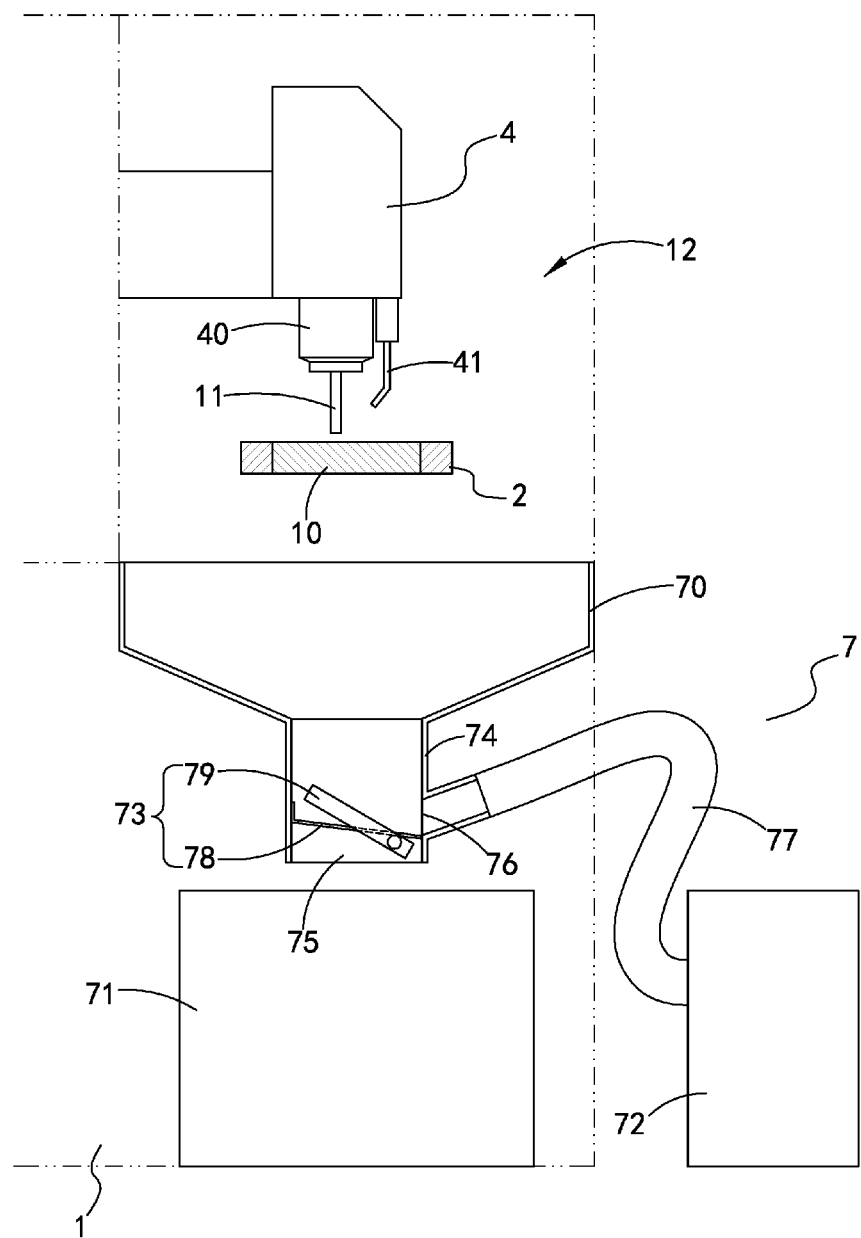
FIG. 11 is a cross sectional view showing the operation of a dust collecting mechanism of the tool changing mechanism of the multi-spindle machining machine in accordance with the present invention.
Figure 12:
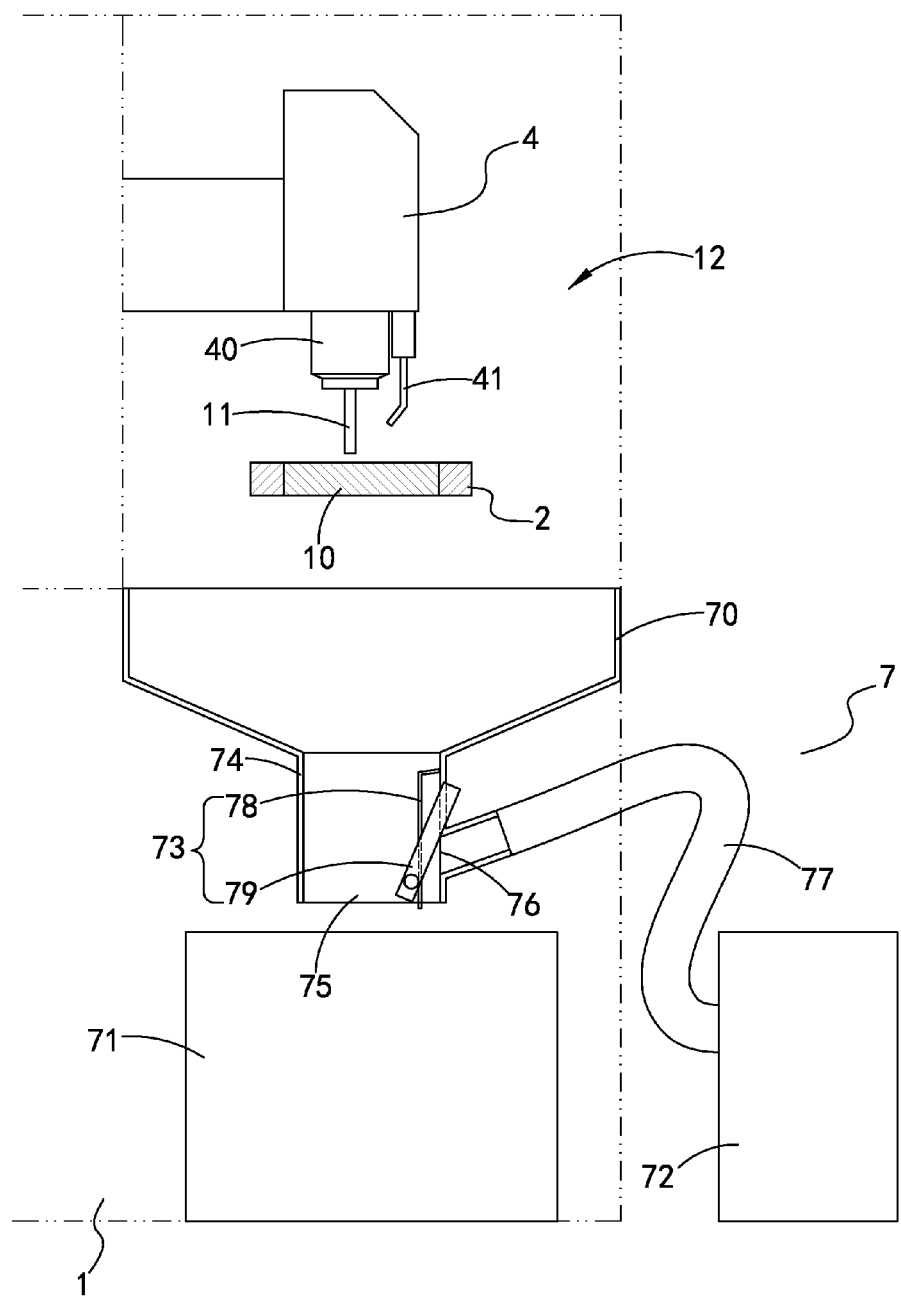
FIG. 12 is another cross sectional view showing the operation of the dust collecting mechanism of the tool changing mechanism of the multi-spindle machining machine in accordance with the present invention.

With reference to FIGS. 11 and 12, the chamber 12 of the base 1 includes a dust collecting mechanism 7 to collect chips and cutting oil generating from the nozzle 41. The dust collecting mechanism 7 includes a groove 70, a tank 71, a dust collector 72, and a switching device 73, wherein the groove 70 is disposed on a lower side of the carrier 2 of the base 1 and formed in a funnel shape to receive the chips and the cutting oil generating from a working process, and includes a pipe 74 communicating with a bottom portion thereof, the pipe 74 includes a first outlet 75 on a bottom end thereof and a second outlet 76 on a wall of one side thereof.

The tank 71 is located below the first outlet 75 to receive the cutting oil falling from the first outlet 75.

The dust collector 72 is connected to the second outlet 76 by using a connecting tube 77 so as to draw chips from the second outlet 76.

The switching device 73 includes a plate member 78 and a controlling pillar 79. The plate member 78 is disposed in the pipe 74 to movably cover the first outlet 75 and the second outlet 76. The controlling pillar 79 is disposed outside the pipe 74 to drive the plate member 78 to swing.

As shown in FIG. 10, when the controlling pillar 79 drives the plate member 78 to cover the first outlet 75, the dust collector 72 is started to draw wind and control the nozzle 41 to stop spraying cutting oil, having a dry cutting process.

As illustrated in FIG. 11, when the controlling pillar 79 drives the plate member 78 to cover the second outlet 76, the dust collector 72 is closed automatically to control the nozzle 41 to spray cutting oil, having a wet cutting process.

While we have shown and described various embodiments in accordance with the present invention, it is clear to those skilled in the art that further embodiments may be made without departing from the scope of the present invention.

What is claimed is:

1. A machining machine comprising:
a base;
a carrier including a seat, a rotary shaft, and a fixing holder, the seat being configured to move relative to the base in a vertical direction, and the vertical direction is a Z axis, the rotary shaft being fixed on the seat so as to project from the seat laterally with respect to the Z-axis along an A-axis, and the rotary shaft driving the fixing holder to rotate about the A-axis, the fixing holder being coupled to an end portion of the rotary shaft to fix a work piece on the fixing holder for rotation with the rotary shaft;
a tool changing mechanism including a mount and a monitor, the mount being mounted to the rotary shaft so as to rotate with the rotary shaft, and the mount including a plurality of slots linearly arrayed on each of an upper side and a lower side of the mount such that each slot receives a respective tool, the monitor being fixed on the seat to measure a length of the tool clamped on a tool driving spindle;
a working head moving above the carrier and the tool changing mechanism, the working head configured to move in two horizontal directions, and the horizontal directions being an X axis and a Y axis, and the working head including the tool driving spindle mounted on a lower end thereof to rotate a tool about an axis in order to machine a workpiece mounted on the fixing holder, and the lower end of the driving spindle configured to engage and disengage one of the tools of the tool changing mechanism to exchange a tool between the tool driving spindle and the mount;
wherein each of the slots of the mount receives a respective fixture module, each fixture module including a respective retaining sheath and a respective O-ring, wherein the respective retaining sheath is fixed in the respective slot and has a respective aperture defined therein to receive a respective one of the tools, and each retaining sheath includes a plurality of cutouts and an indentation, each cutout communicating with the aperture of the respective retaining sheath, and a respective clamping paw being defined between a pair of the cutouts to define a plurality of clamping paws per retaining sheath, and the respective O-ring of the respective fixture module being received in the indentation of the respective retaining sheath so as to form an elastic force such that the plurality of clamping paws deform so as to clamp the respective tool being received in the respective aperture.

2. The machining machine as claimed in claim 1, wherein each slot of the mount has a stepped internal diameter, wherein the fixture modules are each received in a respective mouth of a respective one of the plurality of slots, and wherein the indentation is formed around the plurality of clamping paws.

3. The machining machine as claimed in claim 2, wherein each of the fixture modules includes two screw bolts to screw the respective retaining sheath in the respective slot.

4. The machining machine as claimed in claim 3, wherein a limit recess portion of each of the slots at the mouth of the respective slot has a larger diameter than the rest of the respective slot, wherein each slot of the mount has two orifices defined on two opposite sides of the respective slot, and each orifice has a conical notch communicating with the limit recess of the respective slot, wherein each of the retaining sheaths has a protrusion with a larger diameter than the rest of the respective retaining sheath, which protrusion is mounted on an end side of the respective retaining sheath and is retained in the respective limit recess, the respective protrusion has a conical face defined on a rim thereof, and for each fixture module, the two screw bolts are screwed in the two orifices, and each screw bolt has a conical head portion defined on an end thereof so as to be retained on the respective conical face of the protrusion of the retaining sheath of the respective fixture module.

5. The machining machine as claimed in claim 3, wherein the fixing holder includes a shank and two positioning rods, the shank is coupled to the rotary shaft, and the two positioning rods extend orthogonally from two ends of the shank to fix the work piece on the fixing holder.

6. The machining machine as claimed in claim 1, wherein the tool changing mechanism includes a case and a housing, the case is assembled to the seat and receives the mount and the monitor, and the case includes an opening formed on an upper end thereof, and the housing is assembled to the case in a manner so as to open or close the opening of the case.

7. The machining machine as claimed in claim 6 further comprising a lateral driving device and a vertical driving device, the lateral driving device is located on the base to drive the working head to move along the X and Y axes, and the vertical driving device is fixed on the base and located at an end of one side of the lateral driving device to drive the seat to move vertically in the Z direction.

8. The machining machine as claimed in claim 7, wherein the lateral driving device includes a first guiding member, a second guiding member, a pedestal, a first driver, and a second driver, the first guiding member is mounted on the base, the second guiding member is mounted on the first guiding member so as to move along the X axis, the pedestal is mounted to the second guiding member to move along the Y axis, the first driver is disposed on the first guiding member so as to drive the second guiding member to move along the X axis, the second driver is fixed on the second guiding member to drive the pedestal to move along the Y axis, and the working head is connected to the pedestal;

the vertical driving device includes a third guiding member and a third driving driver, the third guiding member is disposed on the base, the seat is mounted on the third guiding member so as to move along the Z axis, the third driver is secured on the third guiding member to drive the seat to move along the Z axis.

9. The machining machine as claimed in claim 8, wherein the working head includes at least one nozzle to spray cutting oil or air, and the machining machine further includes a dust collecting mechanism having a groove, a tank, a dust collector, and a switching device, wherein the groove is disposed in the base at a lower side of the carrier, and the dust collecting mechanism includes a pipe communicating with a bottom portion of the groove, the pipe includes a first outlet on a bottom end of the pipe and a second outlet on a wall of one side of the pipe, the dust collector is connected to the second outlet by using a connecting pipe, the switching device includes a plate member and a controlling pillar, the plate member is disposed in the pipe to selectively and alternatively movably cover the first outlet and the second outlet.

10. The machining machine as claimed in claim 9, wherein when the controlling pillar drives the plate member to cover the first outlet, the dust collector is started to draw wind and the at least one nozzle is controlled to stop spraying the cutting oil; and when the controlling pillar drives the plate member to cover the second outlet, the dust collector is closed automatically in order to control the at least one nozzle to spray the cutting oil.

11. The machining machine as claimed in claim 9, wherein the controlling pillar is disposed outside the pipe to drive the plate member to swing.

* * * * *